United States Patent
Ahn et al.

(10) Patent No.: US 9,216,762 B2
(45) Date of Patent: Dec. 22, 2015

(54) APPARATUS AND METHOD FOR DRIVING MOTOR DRIVEN POWER STEERING

(71) Applicant: HYUNDAI MOBIS CO., LTD., Seoul (KR)

(72) Inventors: Sang Min Ahn, Yongin-si (KR); Eun Kyung Gu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/199,963

(22) Filed: Mar. 6, 2014

(65) Prior Publication Data

US 2015/0046040 A1 Feb. 12, 2015

(30) Foreign Application Priority Data

Aug. 8, 2013 (KR) .................. 10-2013-0094451
Nov. 26, 2013 (KR) .................. 10-2013-0144741

(51) Int. Cl.
*B62D 5/04* (2006.01)
*B62D 6/00* (2006.01)

(52) U.S. Cl.
CPC .............. *B62D 5/046* (2013.01); *B62D 5/0463* (2013.01)

(58) Field of Classification Search
None
See application file for complete search history.

(56) References Cited

U.S. PATENT DOCUMENTS

| | | | |
|---|---|---|---|
| 2003/0052639 A1* | 3/2003 | Tanaka et al. ................. | 318/632 |
| 2004/0061465 A1* | 4/2004 | Matsuoka ..................... | 318/432 |
| 2007/0021889 A1* | 1/2007 | Tsuchiya ........................ | 701/41 |
| 2007/0100524 A1* | 5/2007 | Sakaguchi et al. .............. | 701/41 |
| 2011/0153162 A1* | 6/2011 | Kezobo et al. ................. | 701/42 |
| 2012/0035807 A1* | 2/2012 | Hosoya et al. .................. | 701/37 |
| 2012/0232755 A1* | 9/2012 | Birsching ....................... | 701/41 |
| 2013/0075191 A1* | 3/2013 | Iwase ............................. | 180/446 |
| 2013/0190986 A1* | 7/2013 | Nishimori ....................... | 701/41 |
| 2014/0019008 A1* | 1/2014 | Nakamura et al. .............. | 701/42 |
| 2015/0088381 A1* | 3/2015 | Imamura et al. ................ | 701/41 |

FOREIGN PATENT DOCUMENTS

KR  10-2013-0064914 A  6/2013

* cited by examiner

*Primary Examiner* — Yonel Beaulieu
*Assistant Examiner* — Krishnan Ramesh
(74) *Attorney, Agent, or Firm* — Knobbe Martens Olson & Bear LLP

(57) ABSTRACT

An apparatus for driving a motor driven power steering (MDPS) may include: a first calculation unit configured to calculate a damping force gain based on an MDPS output current; a second calculation unit configured to calculate a damping force using vehicle speed and steering angle speed; and a damping force calculation unit configured to calculate a final damping force using the damping force gain calculated through the first calculation unit and the damping force calculated through the second calculation unit.

10 Claims, 5 Drawing Sheets

APPARATUS AND METHOD FOR DRIVING MOTOR DRIVEN POWER STEERING

CROSS-REFERENCES TO RELATED APPLICATIONS

The present application claims priority to Korean application number 10-2013-0094451, filed on Aug. 8, 2013, and 10-2013-0144741, filed on Nov. 26, 2013, which is incorporated by reference in its entirety.

BACKGROUND OF THE INVENTION

The present invention relates to an apparatus and method for driving a motor driven power steering (MDPS), and more particularly, to an apparatus and method for driving MDPS, which calculates a damping force using a damping force calculated through vehicle speed and steering angle speed, and a damping force gain based an MDPS output current.

MDPS is a device which converts torque, generated while a driver turns a steering wheel, into an actual output to enable the driver to steer a vehicle.

Depending on how to control steering, MDPS may be classified into C-MDPS, P-MDPS, R-MDPS and the like. Among them, C-MDPS includes a motor mounted on a column shaft, and damping logic used for C-MDPS is a function of improving the yaw stability of a vehicle using a motor current.

In the conventional damping logic, however, damping torque linearly increases with the increase of steering angle speed. Thus, a hysteresis width may increase in an on-center section. That is, the hysteresis width may not be uniformly maintained to have a bad effect on safe operation of the vehicle.

Furthermore, the conventional damping logic may apply an excessive damping force on a low-friction road, thereby having a bad effect on safe operation of the vehicle.

The related art of the present invention is disclosed in Korean Patent Laid-open Publication No. 10-2013-0064914 published on Jun. 6, 2013 and entitled "Motor driven power steering and control method thereof".

SUMMARY OF THE INVENTION

An embodiment of the present invention is directed to an apparatus and method for driving MDPS, which calculates a damping force using vehicle speed and steering angle speed, and uniformly maintains a hysteresis width regardless of steering angle speed during steering operation, thereby maintaining a uniform torque build-up.

Another embodiment of the present invention is directed to an apparatus and method for driving MDPS, which feeds back and reflects a previous final damping force into an MDPS output current so as to remove delay caused by calculating the previous final damping force, and limits a result value calculated through vehicle speed and steering angle speed, thereby suppressing an excessive output during a sudden steering maneuver.

Another embodiment of the present invention is directed to an apparatus and method for driving MDPS, which calculates a damping force using an MDPS output current, thereby not only reducing a sense of difference during operation on a low-friction road (snow-covered row, icy road, or wet road), but also substantially preventing vehicle instability caused by an excessive damping force.

In one embodiment, an apparatus for driving a motor driven power steering (MDPS) may include: a first calculation unit configured to calculate a damping force gain based on an MDPS output current; a second calculation unit configured to calculate a damping force using vehicle speed and steering angle speed; and a damping force calculation unit configured to calculate a final damping force using the damping force gain calculated through the first calculation unit and the damping force calculated through the second calculation unit.

The damping force calculation unit may calculate the final damping force using the damping force gain calculated through the first calculation unit, the damping force calculated through the second calculation unit, and the steering angle speed.

The second calculation unit may calculate the damping force by referring to a 2D map which is tuned according to the vehicle speed and the steering angle speed.

The first calculation unit may calculate a damping force gain using the MDPS output current and a fed-back previous final damping force, and the damping force calculation unit may calculate a final damping force using the damping force gain calculated through the first calculation unit and a limited value based on the damping force calculated through the second calculation unit.

The first calculation unit may calculate the damping force gain based on a difference between the MDPS output current and a value obtained by multiplying the fed-back previous final damping force by a gain, and pass the calculated damping force gain through a low-pass filter to calculate a damping force gain whose high-frequency component is reduced.

In another embodiment, a method for driving MDPS may include: calculating a damping force gain using an MDPS output current; calculating a damping force using vehicle speed and steering angle speed; and calculating a final damping force using the calculated damping force gain and the calculated damping force.

The calculating of the final damping force may include calculating the final damping force using the calculated damping force gain, the calculated damping force, and the steering angle speed.

The calculating of the damping force may include calculating the damping force by referring to a 2D map which is tuned according to the vehicle speed and the steering angle speed.

The calculating of the final damping force may include calculating the final damping force by multiplying the calculated damping force gain, the calculated damping force, and the steering angle speed.

The calculating of the damping force gain may include calculating a damping force gain using the MDPS output current and a fed-back previous final damping force, and the calculating of the final damping force may include calculating a final damping force using the calculated damping force gain and a limited value based on the calculated damping force.

The calculating of the damping force gain may include: calculating a difference between the MDPS output current and a value obtained by multiplying the fed-back previous final damping force by a gain; and calculating a damping force gain based on the calculated difference, and passing the calculated damping force gain through a low-pass filter to calculate the damping force gain whose high-frequency component is reduced.

The calculating of the damping force may include: calculating a damping force gain based on the vehicle speed; and calculating the damping force by multiplying the steering angle speed by the damping force gain based on the vehicle speed.

The calculating of the final damping force may include calculating the final damping force by multiplying the calculated damping force gain by a limited value based on the damping force calculated through the vehicle speed and the steering angle speed.

In accordance with the embodiments of the present invention, the apparatus and method for driving MDPS in accordance with the embodiment of the present invention may calculate a damping force using vehicle speed and steering angle speed, and uniformly maintain a hysteresis width regardless of the steering angle speed during steering operation, thereby maintaining a uniform torque build-up. Thus, the on-center steering feel may be improved to minimize a sense of difference during steering operation.

Furthermore, as a previous final damping force is fed back and reflected into the MDPS output current when a damping force is calculated, delay caused by calculating the previous final damping force may be removed to thereby response.

Furthermore, as a result value calculated through vehicle speed and steering angle speed is limited when a damping force is calculated, an excessive output may be suppressed during a sudden steering maneuver. Therefore, it is possible to minimize a sense of difference during steering operation.

Furthermore, the apparatus and method for driving MDPS may calculate a damping force using an MDPS output current, thereby not only reducing a sense of difference during operation on a low-friction road (snow-covered row, icy road, or wet road), but also substantially preventing vehicle instability caused by an excessive damping force.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

In general, a motor torque command of MDPS is calculated using a value calculated through torque control logic, damping control logic, and active returnability control logic. The present invention provides an apparatus and method for calculating a damping force through the damping control logic.

Figure 1:
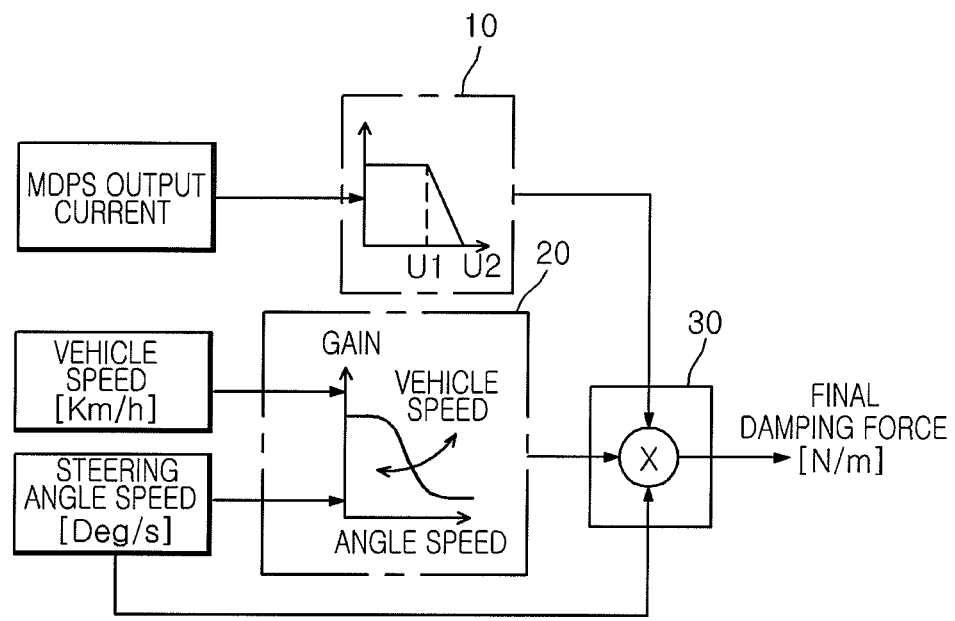
FIG. 1 is a diagram for explaining an apparatus for driving MDPS in accordance with an embodiment of the present invention.

FIG. 1 is a diagram for explaining an apparatus for driving MDPS in accordance with an embodiment of the present invention.

Referring to FIG. 1, the apparatus for driving MDPS in accordance with the embodiment of the present invention may include a first calculation unit 10, a second calculation unit 20, and a damping force calculation unit 30.

The first calculation unit 10 may calculate a damping force gain based on an MDPS output current.

More specifically, the first calculation unit 10 may input the MDPS output current to a ratio adjusting block to calculate a damping force gain.

The second calculation unit 20 may calculate a damping force using vehicle speed and steering angle speed.

More specifically, the second calculation unit 20 may calculate a damping force by referring a 2D map which is tuned according to vehicle speed sensed through a vehicle speed sensor (not illustrated) and steering angle speed sensed through a steering angle sensor (not illustrated).

That is, as the damping force gain is adjusted according to the steering angle speed, a hysteresis width may be maintained.

The damping force calculation unit 30 may calculate a final damping force using the damping force gain calculated through the first calculation unit 10, the damping force calculated through the second calculation unit 20, by the steering angle speed.

More specifically, the final damping force may be calculated by multiplying the damping force gain calculated through the first calculation unit, the damping force calculated through the second calculation unit 20, and the steering angle speed.

Figure 2:
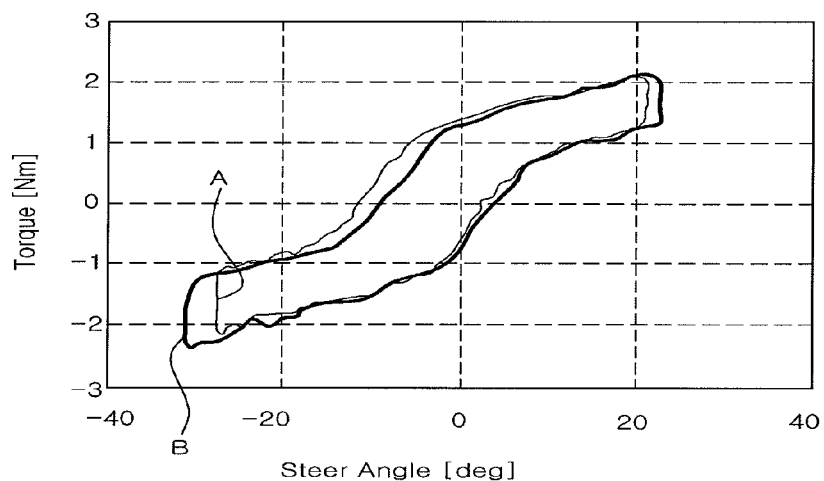
FIG. 2 is a graph comparatively illustrating hysteresis widths before and after the apparatus for driving MDPS in accordance with the embodiment of the present invention is applied.

FIG. 2 is a graph comparatively illustrating hysteresis widths before and after the apparatus for driving MDPS in accordance with the embodiment of the present invention is applied.

As known from hysteresis curves of FIG. 2, it can be seen that a hysteresis curve B after the apparatus for driving MDPS is applied has a more uniform width than a hysteresis curve A before the apparatus for driving MDPS is applied. That is, the hysteresis curve B maintains a uniform torque build-up.

Figure 3:
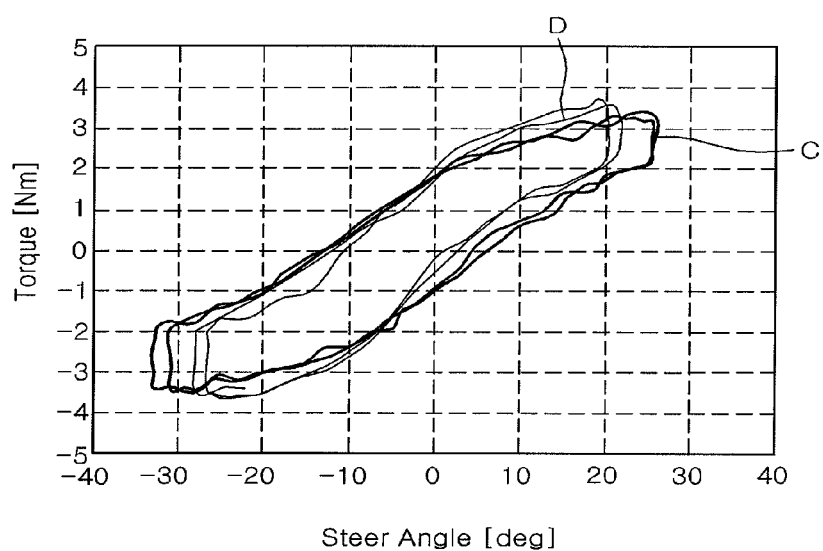
FIG. 3 illustrates a hysteresis compensation result depending on steering angle speed in the apparatus for driving MDPS in accordance with the embodiment of the present invention.

FIG. 3 illustrates a hysteresis compensation result depending on steering angle speed in the apparatus for driving MDPS in accordance with the embodiment of the present invention.

In FIG. 3, a graph C illustrates a hysteresis curve when steering angle speed is as low as 0.3 Hz, and a graph D illustrates a hysteresis curve when steering angle speed is as high as 0.7 Hz. Referring to FIG. 3, it can be seen that both of the graphs C and D maintain a uniform hysteresis width. That is, a uniform torque build-up may be maintained regardless of the steering angle speeds.

As described above, the apparatus for driving MDPS in accordance with the embodiment of the present invention may calculate a damping force using vehicle speed and steering angle speed, and constantly maintain a hysteresis width regardless of the steering angle speed during steering operation, thereby maintaining a uniform torque build-up. Thus, the on-center steering feel may be improved to minimize a sense of difference during steering operation.

Figure 4:
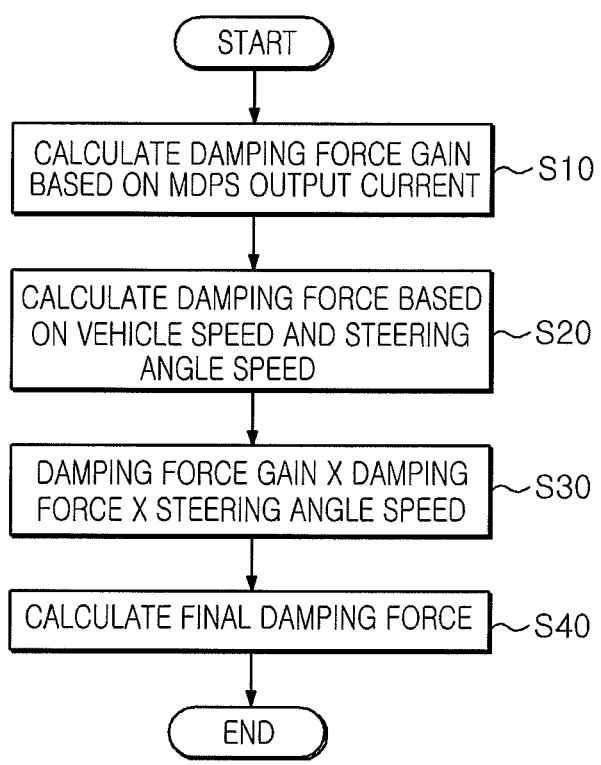
FIG. 4 is a flowchart illustrating a method for driving MDPS in accordance with an embodiment of the present invention.

FIG. 4 is a flowchart illustrating a method for driving MDPS in accordance with an embodiment of the present invention. Referring to FIG. 4, the method for driving MDPS in accordance with the embodiment of the present invention will be described in detail.

First, a damping force gain may be calculated using an MDPS output current at step S10.

More specifically, the MDPS output current may be inputted to the ratio adjusting block to calculate the damping force gain.

Then, a damping force may be calculated using vehicle speed and steering angle speed at step S20.

More specifically, the damping force may be calculated by referring to a 2D map which is tuned according to the vehicle speed sensed through the vehicle sensor (not illustrated) and the steering angle speed sensed through the steering angle sensor (not illustrated).

The damping force gain calculated through step S10, the damping force calculated through the step S20, and the steering angle speed may be used to calculate a final damping force at steps S30 and S40.

More specifically, the final damping force may be calculated by multiplying the damping force gain calculated through step S10, the damping force calculated through step S20, by the steering angle speed.

As described above, the method for driving MDPS in accordance with the embodiment of the present invention may calculate a damping force using vehicle speed and steering angle speed, and uniformly maintain a hysteresis width regardless of the steering angle speed during steering operation, thereby maintaining a uniform torque build-up. Thus, the on-center steering feel may be improved to minimize a sense of difference during steering operation.

Figure 5:
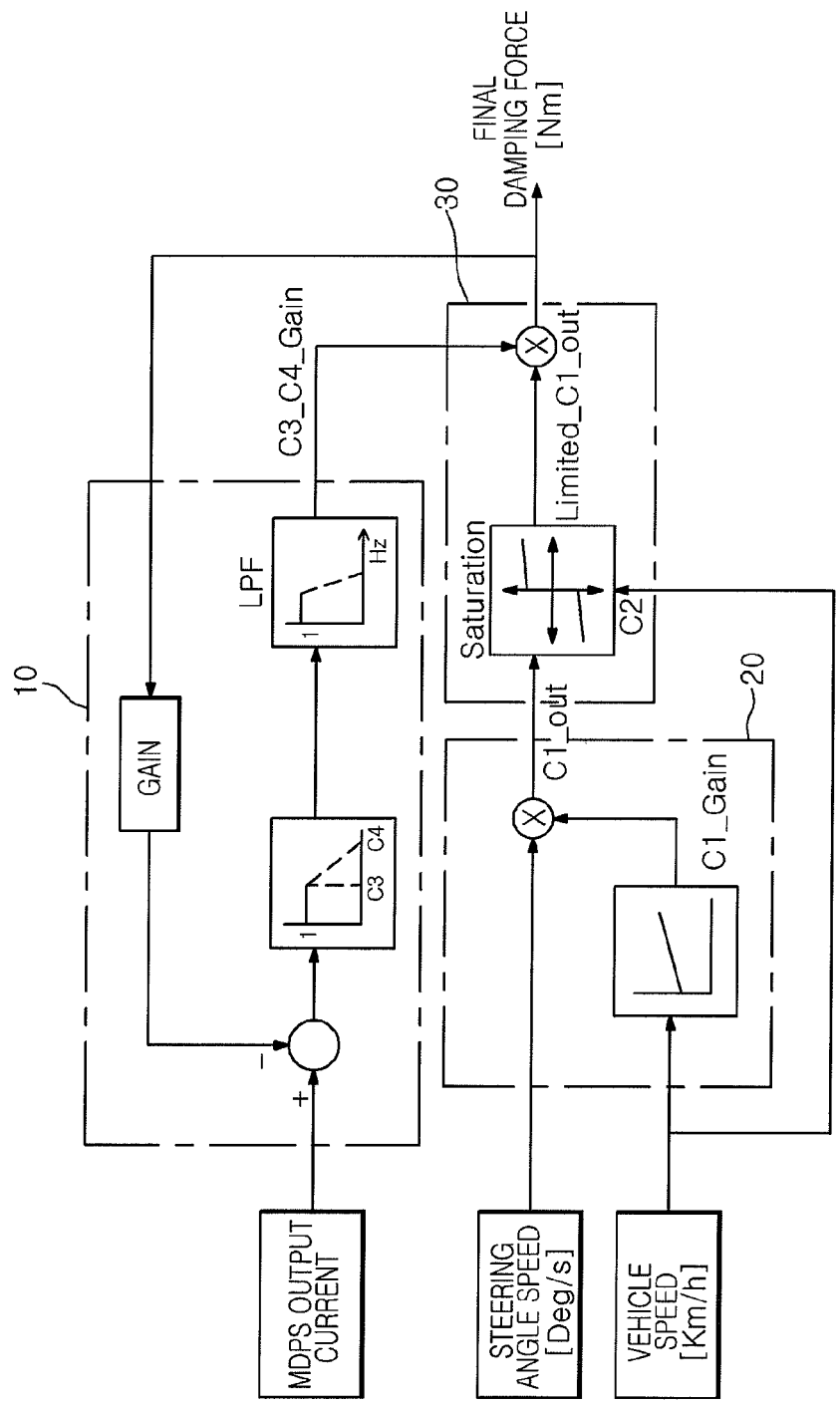
FIG. 5 is a diagram for explaining an apparatus for driving MDPS in accordance with another embodiment of the present invention.

FIG. 5 is a diagram for explaining an apparatus for driving MDPS in accordance with another embodiment of the present invention.

Referring to FIG. 5, the apparatus for driving MDPS in accordance with the embodiment of the present invention may include a first calculation unit 10, a second calculation unit 20, and a damping force calculation unit 30.

The first calculation unit 10 may calculate a damping force gain C3_C4_Gain using an MDPS output current and a fedback previous final damping force.

More specifically, the first calculation unit 10 may input a difference between the MDPS output current and a value obtained by multiplying the previous final damping force by a gain, to the ratio adjusting block and calculate a damping force gain. Then, the first calculation unit 10 may pass the calculated damping force gain through a low-pass filter LPF and calculate the damping force gain C3_C4_Gain whose high-frequency component is reduced.

Thus, as the previous final damping force is fed back and reflected into the MDPS output current, delay caused by calculating the previous final damping force may be removed to thereby response.

The second calculation unit 20 may calculate a damping force C1_Out using a damping force gain C1_gain based on steering angle speed and vehicle speed.

More specifically, the second calculation unit 20 may calculate the damping force C1_out by multiplying the damping force gain C1_Gain based on the vehicle speed sensed through a vehicle speed sensor (not illustrated) by the steering angle speed sensed through a steering angle sensor (not illustrated).

The damping force calculation unit 30 may calculate a final damping force using the damping force gain C3_C4_Gain calculated through the first calculation unit 10 and a limited value Limited_C1_Out based on the damping force C1_Out calculated through the second calculation unit 20.

More specifically, the damping force calculation unit 30 may calculate a final damping force by multiplying the damping force gain C3_C4_Gain calculated through the first calculation unit 10 by the limited value Limited_C1_Out based on the damping force C1_Out calculated through the second calculation unit 20.

At this time, the limited value Limited_C1_Out based on the damping force C1_Out calculated through the second calculation unit 20 may be calculated by inputting the damping force C1_Out calculated through the second calculation unit 20 to a saturation block.

As illustrated in FIG. 5, the damping force C1_Out calculated through the second calculation unit 20 may be inputted to the saturation block to calculate the limited value Limited_C1_Out of the damping force C1_Out according to the direction of a steering wheel (not illustrated), sensed through the steering angle sensor.

Thus, as the result value calculated through the vehicle speed and the steering angle speed is limited when the damping force is calculated, an excessive output may be suppressed during a sudden steering maneuver. Therefore, it is possible to minimize a sense of difference during steering operation.

Then, a final damping force may be calculated by multiplying the limited value Limited_C1_Out based on the damping force C1_Out by the damping force gain C3_C4_Gain.

Furthermore, as the final damping force is multiplied by a gain and fed back to the first calculation unit 10, the final damping force may be used to calculate a next damping force gain C3_C4_Gain. Thus, delay caused by calculating the previous final damping force may be removed to thereby improve response.

As described above, the apparatus for driving MDPS in accordance with the embodiment of the present invention may calculate the damping force using the MDPS output current, thereby not only reducing a sense of difference during operation on a low-friction road (snow-covered row, icy road, or wet road), but also substantially preventing vehicle instability caused by an excessive damping force.

Figure 6:
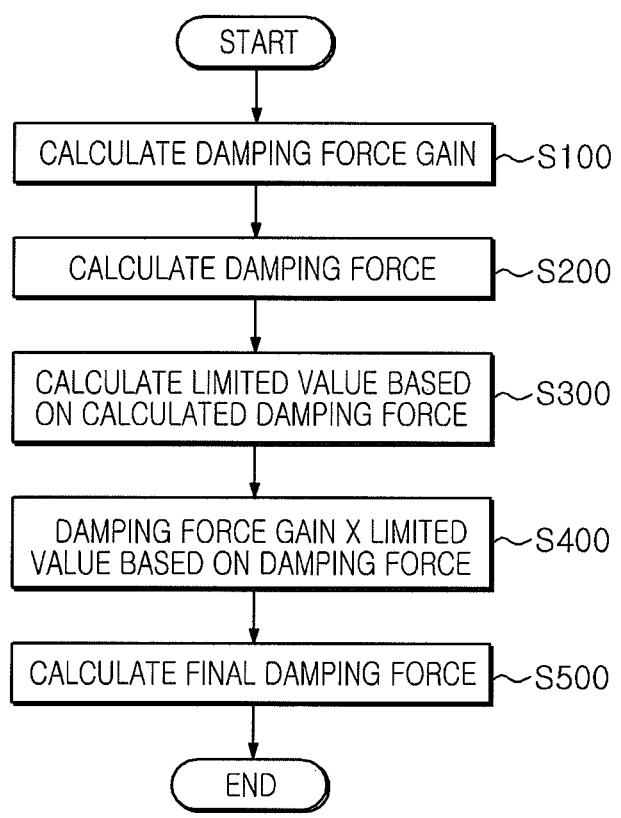
FIG. 6 is a flowchart illustrating a method for driving MDPS in accordance with another embodiment of the present invention.

FIG. 6 is a flowchart illustrating a method for driving MDPS in accordance with another embodiment of the present invention.

First, an MDPS output current and a fed-back previous final damping force may be used to calculate a damping force gain C3_C4_Gain at step S100.

More specifically, a difference between the MDPS output current and a value obtained by multiplying the previous final damping force by a gain may be inputted to the ratio adjusting block to calculate a damping force gain, and the calculated damping force gain may be passed through the low-pass filter LPF to calculate the damping force gain C3_C4_Gain whose high-frequency component is reduced.

Thus, as the previous final damping force is fed back and reflected into the MDPS output current, delay caused by calculating the previous final damping force may be removed to thereby improve response.

Then, a damping force C1_Out may be calculated using vehicle speed and steering angle speed at step S200.

More specifically, the second calculation unit 20 may calculate the damping force C1_Out by multiplying the damping force gain C1_Gain based on the vehicle speed sensed through the vehicle speed sensor (not illustrated) by the steering angle speed sensed through the steering angle sensor (not illustrated).

Then, a limited value Limited_C1_Out may be calculated based on the damping force C1_Out calculated through the vehicle speed and the steering angle speed, at step S300.

At this time, the limited value Limited_C1_Out based on the damping force C1_Out may be calculated by inputting the damping force C1_Out calculated through the vehicle speed and the steering angle speed to the saturation block.

Thus, as the result value calculated through the vehicle speed and the steering angle speed is limited when the damping force is calculated, an excessive output may be suppressed during a sudden steering maneuver. Therefore, it is possible to minimize a sense of difference during steering operation.

Then, a final damping force may be calculated by multiplying the damping force gain C3_C4_Gain calculated at step S100 by the limited value Limited_C1_Out based on the damping force C1_Out calculated at step S300, at steps S400 and S500.

Furthermore, as the final damping force is multiplied by a gain and fed back to the first calculation unit 10, the final damping force may be used to calculate a next damping force gain C3_C4_Gain. Thus, delay caused by calculating the previous final damping force may be removed to thereby improve response.

As described above, the method for driving MDPS in accordance with the embodiment of the present invention may calculate the damping force using the MDPS output current, thereby not only reducing a sense of difference during operation on a low-friction road (snow-covered row, icy road, or wet road), but also substantially preventing vehicle instability caused by an excessive damping force.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A motor driven power steering (MDPS) system, comprising:
    an MDPS motor for power steering;
    at least one damping control logic device configured:
    to calculate a damping force gain;
    to calculate a damping force using vehicle speed and steering angle speed; and
    to calculate a final damping force for use in controlling the MDPS motor,
    wherein the damping force gain is calculated using an MDPS output current and a fed-back previous final damping force,
    wherein the final damping force is calculated using the damping force gain and a limited value obtained using the damping force,
    wherein the MDPS motor is controlled using the final damping force.

2. The system of claim 1, wherein the limited value based on the damping force is calculated by inputting the damping force to a saturation block, wherein the final damping force is calculated by multiplying the limited value by the damping force gain.

3. The system of claim 2, wherein the damping force is calculated by referring to a 2D map which is tuned according to the vehicle speed and the steering angle speed.

4. The system of claim 1, wherein the damping force gain is calculated based on a difference between the MDPS output current and a value obtained by multiplying the fed-back previous final damping force by a gain, and wherein a high frequency component of the damping force gain is removed at a low-pass filter.

5. A method for driving an MDPS system, comprising:
    calculating a damping force gain;
    calculating a damping force using vehicle speed and steering angle speed;
    calculating a final damping force; and
    controlling an MDPS motor using the final damping force,
    wherein the damping force gain is calculated using an MDPS output current and a fed-back previous final damping force,
    wherein the final damping force is calculated using the damping force gain and a limited value obtained using the damping force.

6. The method of claim 5, wherein the limited value based on the damping force is calculated by inputting the damping force to a saturation block, wherein the final damping force is calculated by multiplying the limited value by the damping force gain.

7. The method of claim 6, wherein the damping force is calculated by referring to a 2D map which is tuned according to the vehicle speed and the steering angle speed.

8. The method of claim 6, wherein the final damping force is calculated by multiplying the calculated damping force gain, the calculated damping force, and the steering angle speed.

9. The method of claim 5, wherein the damping force gain is calculated based on a difference between the MDPS output current and a value obtained by multiplying the fed-back previous final damping force by a gain, wherein a high frequency component of the damping force is removed at a low-pass filter.

10. The method of claim 5, wherein the final damping force is calculated by multiplying the calculated damping force gain by the limited value.

* * * * *